(12) United States Patent
Lerner

(10) Patent No.: US 9,398,227 B2
(45) Date of Patent: Jul. 19, 2016

(54) SYSTEM AND METHOD FOR ESTIMATING DAYTIME VISIBILITY

(75) Inventor: Ronen Lerner, Binyamina (IL)

(73) Assignee: GM Global Technology Operations LLC, Detroit, MI (US)

( * ) Notice: Subject to any disclaimer, the term of this patent is extended or adjusted under 35 U.S.C. 154(b) by 939 days.

(21) Appl. No.: 13/343,762

(22) Filed: Jan. 5, 2012

(65) Prior Publication Data

US 2013/0176425 A1   Jul. 11, 2013

(51) Int. Cl.
*H04N 7/18* (2006.01)
*H04N 5/235* (2006.01)
*H04N 21/81* (2011.01)

(52) U.S. Cl.
CPC ......... *H04N 5/2351* (2013.01); *H04N 21/8153* (2013.01)

(58) Field of Classification Search
CPC .................................................... H04N 5/2351
See application file for complete search history.

(56) References Cited

U.S. PATENT DOCUMENTS

| | | | |
|---|---|---|---|
| 6,362,773 B1* | 3/2002 | Pochmuller | 342/52 |
| 7,049,945 B2* | 5/2006 | Breed et al. | 340/435 |
| 7,274,386 B2* | 9/2007 | Pochmuller | B60R 16/0237 348/135 |
| 2008/0154629 A1* | 6/2008 | Breed et al. | 705/1 |
| 2012/0062372 A1* | 3/2012 | Augst | G06K 9/00798 340/435 |

\* cited by examiner

*Primary Examiner* — Andy Rao
*Assistant Examiner* — Tyler Edwards
(74) *Attorney, Agent, or Firm* — Quinn Law Group, PLLC

(57) ABSTRACT

A system for estimating daytime visibility conditions includes a camera configured to capture a video sequence over a period time, an odometry sensor configured to monitor motion of the camera, and a video processing unit in communication with the camera and with the odometry sensor. The video processing unit is configured to receive the video sequence from the camera, detect an object within the video sequence, estimate a distance between the camera and the object for each frame of the video sequence, determine a mean perceived brightness of the object for each image frame, and estimate an ambient visibility using the estimated distance and mean perceived brightness of the object.

16 Claims, 3 Drawing Sheets

SYSTEM AND METHOD FOR ESTIMATING DAYTIME VISIBILITY

TECHNICAL FIELD

The present invention relates generally to systems for estimating daytime visibility conditions, such as may exist outside of an automotive vehicle.

BACKGROUND

Visibility is typically a measure of the distance at which an object may be clearly discerned. Visibility may be greatly reduced by various environmental factors such as haze, fog, rain, and/or dust/sand. These environmental conditions may impair the ability of an operator of a motor vehicle to safely navigate even the most familiar of roads. In particular, such visibility conditions affect the maximum distance in which a vehicle operator can observe obstacles, pedestrians, and other vehicles.

SUMMARY

A system for estimating daytime visibility conditions includes a camera configured to capture a video sequence over a period of time, an odometry sensor configured to monitor motion of the camera, and a video processing unit in communication with the camera and with the odometry sensor.

The video processing unit may be configured to receive the video sequence from the camera, detect an object within the video sequence, estimate a distance between the camera and the object for each image frame of the video sequence, determine a mean perceived brightness of the object for each image frame, and estimate an ambient visibility using the estimated distances and mean perceived brightness values of the object.

In one configuration, the video processing unit may estimate the ambient visibility by assembling a plurality of point pairs, with each point pair including an estimated distance of the object and a determined mean perceived brightness of the object. Each point pair may correspond to the object in a different one of the plurality of image frames of the video sequence. Once the point pairs are assembled, the video processing unit may fit a curve to the plurality of point pairs, where the curve may be based on a range-dependent object brightness model. From the fitted curve, a scattering coefficient may be determined to approximate the ambient visibility.

The video processing unit may detect an object within the video sequence by first detecting an image region having defined boundaries (i.e., defined within a particular tolerance); and by examining the motion of the image region between at least two frames of the video sequence for motion of the object within the frames. The video processing unit may then estimate the distance between the camera and the object using differences in the image location of the object between at least two of the plurality of image frames, together with data from the odometry sensor (e.g., using triangulation techniques).

In a further embodiment, the video processing unit may be configured to compare the estimate of ambient visibility to a threshold, and to perform a control action if the estimate exceeds the threshold. For example, the system may include a light source, such as an indicator light, or a fog light/ headlamp, and the control action may include illuminating the light source. In another embodiment, the system may be included with an automotive vehicle, and the control action may include limiting the maximum speed of an engine of the vehicle. Furthermore, the estimate of ambient visibility may be used to weight various sensor inputs in a composite sensor fusion.

Similarly, a method of estimating an ambient visibility may include acquiring a video sequence from a camera associated with a moving vehicle, wherein the video sequence includes a plurality of image frames, detecting an object within the video sequence, estimating a distance between the camera and the object for each of the plurality of image frames, determining a mean perceived brightness of the object for each of the plurality of image frames, and estimating an ambient visibility using the estimated distance and mean perceived brightness of the object across the plurality of image frames. In a further embodiment, the method may additionally include comparing the estimate of ambient visibility to a threshold, and performing a control action if the estimate exceeds the threshold.

In one configuration, the step of estimating an ambient visibility may include assembling a plurality of point pairs, where each point pair includes an estimated distance of the object and a determined mean perceived brightness of the object. Each point pair may further correspond to the object in a different respective one of the plurality of image frames. The estimating may further involve fitting a curve to the plurality of point pairs, which may be based on a range-dependent object brightness model. From the curve, the system may then determine a scattering coefficient that may approximate the ambient visibility. Additionally, detecting an object within the video sequence may include detecting an image region having defined boundaries, and examining the motion of the image region between at least two of the plurality of image frames for motion of the object within the frame.

Additionally, the method may include detecting a plurality of objects within the video sequence, estimating a distance between the camera and each of the plurality of objects, determining a mean perceived brightness of each object, and determining a scattering coefficient from the estimated distances and mean perceived brightnesses.

The above features and advantages and other features and advantages of the present invention are readily apparent from the following detailed description of the best modes for carrying out the invention when taken in connection with the accompanying drawings.

DETAILED DESCRIPTION

Figure 1:
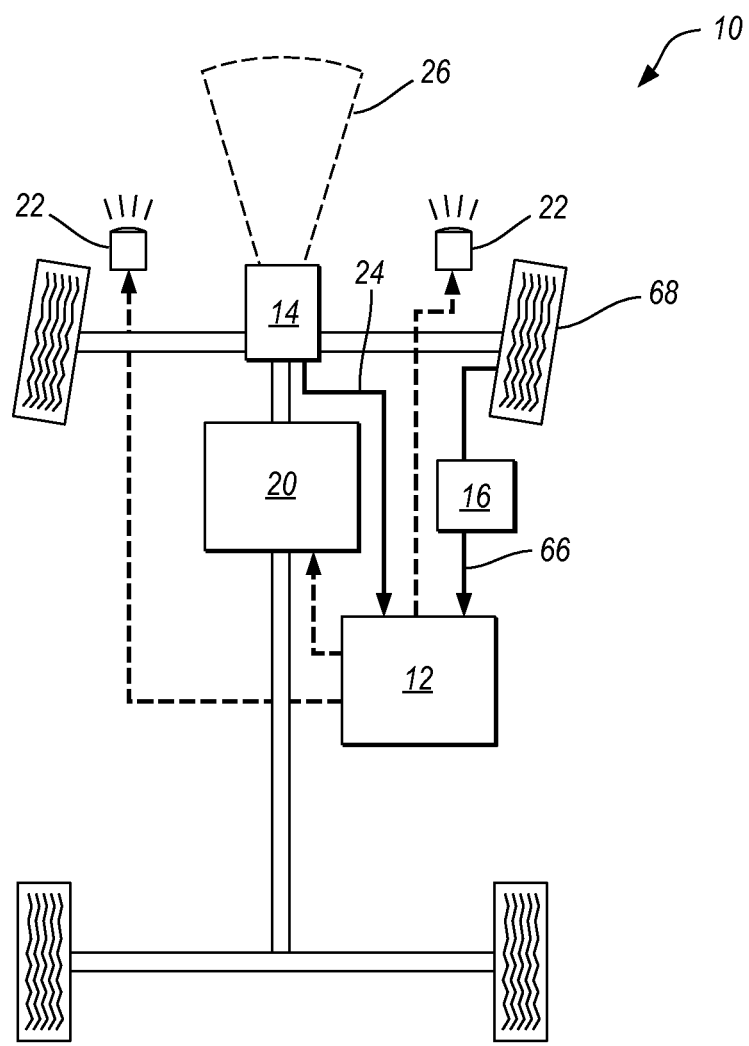
FIG. 1 is a schematic diagram of a vehicle including a system for estimating daytime visibility.

Referring to the drawings, wherein like reference numerals are used to identify like or identical components in the various views, FIG. 1 schematically illustrates a vehicle 10 having a video processing unit 12 in communication with a forwardlooking camera 14 and an odometry sensor 16. As will be explained in greater detail below, the video processing unit 12 may estimate the visibility conditions outside the vehicle 10 using the perceived brightness of one or more apparently stationary objects, as viewed by the camera 14, together with motion data received from the odometry sensor 16. This visibility estimation may subsequently be used to modify the behavior of different vehicle systems, such as for example, the engine/powertrain 20 or headlights 22.

The video processing unit 12 may be embodied as one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. The individual control/processing routines resident in the video processing unit 12 or readily accessible thereby may be stored in ROM or other suitable tangible memory locations and/or memory devices, and may be automatically executed by associated hardware components of the video processing unit 12 to provide the respective processing functionality.

The video processing unit 12 may receive an analog or digital data stream 24 from one or more cameras 14 that are respectively configured to capture video imagery within a particular field of view 26. The one or more cameras 14 may each respectively include one or more lenses and/or filters adapted to receive and/or shape light from within the field of view 26 onto an image sensor. The image sensor may include, for example, one or more charge-coupled devices (CCDs) configured to convert light energy into a digital signal. The one or more cameras 14 may be positioned in any suitable orientation/alignment with the vehicle 10, provided that they may reasonably view one or more objects located adjacent to the path of travel (e.g., on the side of the road). In one configuration, the camera 14 may be disposed within the front or rear grille of the vehicle 10. In another configuration, the camera 14 may be disposed within one of the windshields of the vehicle 10 and oriented in a generally forward (or backward) facing direction (e.g., on a forward-facing surface of the rear-view mirror).

Figure 2:
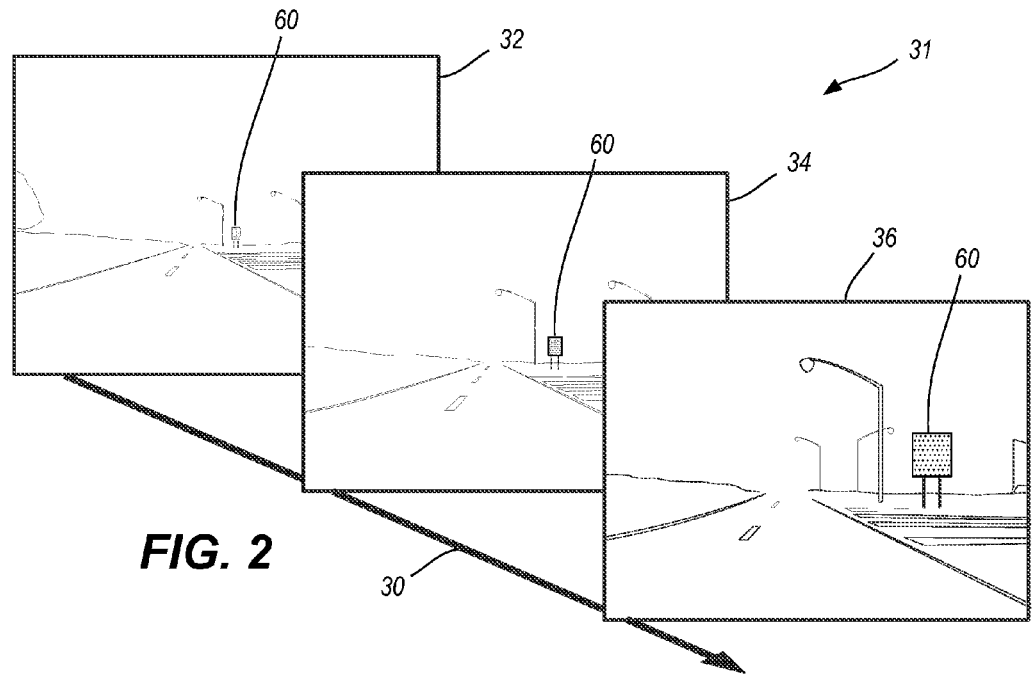
FIG. 2 is a schematic illustration of a video sequence captured by a moving camera over a period of time.
Figure 3:
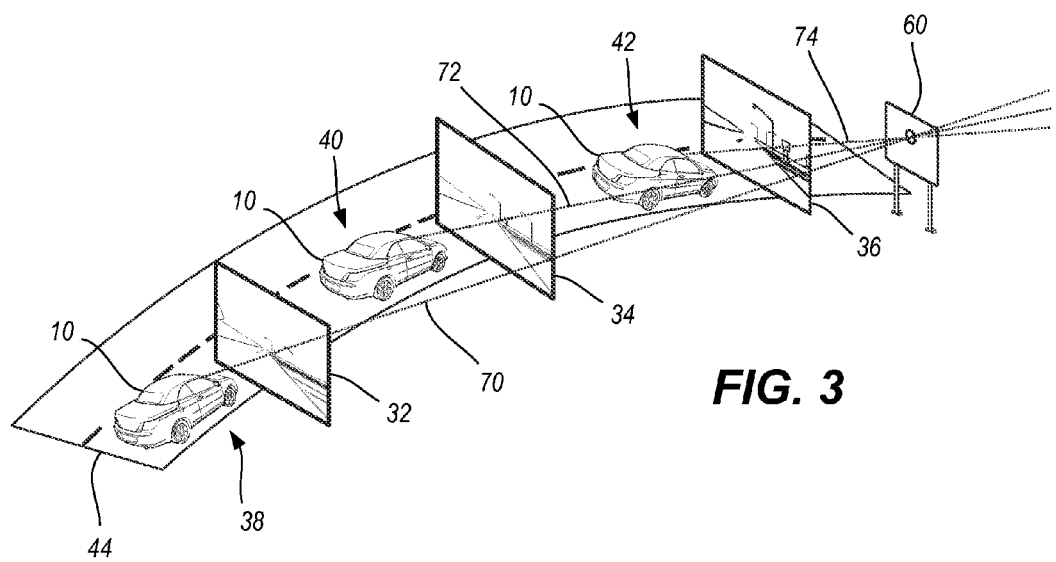
FIG. 3 is a schematic perspective illustration of a vehicle moving along a path of travel and capturing a video sequence such as depicted in FIG. 2.

As generally illustrated in FIGS. 2-3, over time 30, a camera 14 may capture a video sequence 31 that may include a plurality of discrete two-dimensional images or image frames (e.g. image frames 32, 34, 36). Assuming the vehicle 10 is in motion, as generally represented in FIG. 3, each frame 32, 34, 36 within the video sequence 31 may correspond to the view of the camera 14 at a different respective position 38, 40, 42 along the path of travel 44. Each image frame may then be separately passed from the camera 14 to the video processing unit 12 via the data stream 24, where it may be analyzed and/or processed to estimate the ambient visibility.

Figure 4:
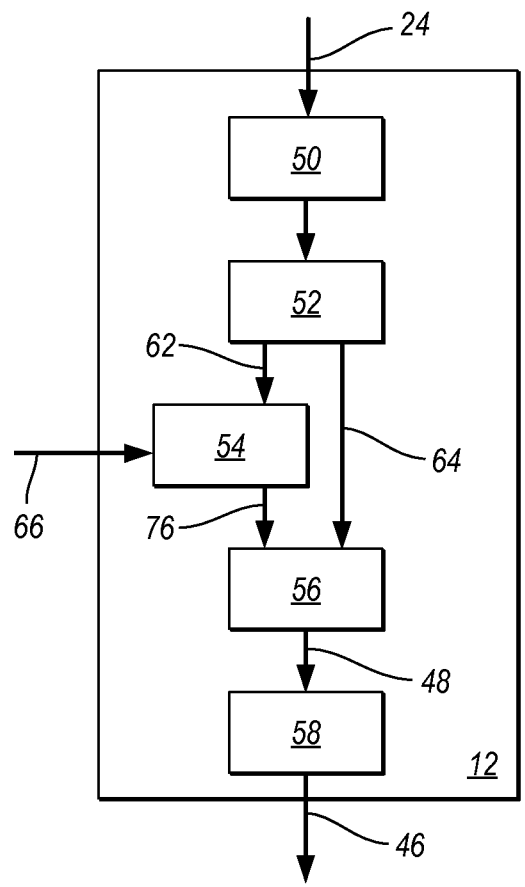
FIG. 4 is a schematic block diagram of a video processing unit configured for estimating daytime visibility.

As schematically illustrated in FIG. 4, the video processing unit 12 may include various processing modules that may receive the video data stream 24, and may ultimately output a control signal 46. The control signal 46 may, in turn, be based on a computed estimate of the ambient visibility 48. Each processing module may be embodied, for example, as a software routine or control algorithm, which may be executed by the video processing unit 12. The processing modules may include, for example, an object detection module 50, an object tracking module 52, an object range estimation module 54, a visibility estimation module 56, and a system control module 58.

Upon receiving the video data stream 24, the object detection module 50 may analyze each respective frame for the presence of one or more discrete objects or image regions. These objects may include visual artifacts/image regions with clearly defined edges, and that may move in a continuous manner from frame to frame.

After detecting the presence of the one or more objects (e.g., street sign 60), the object tracking module 52 may then quantitatively determine/track the location 62 of each respective object within each frame object. For each identified object, the location 62 within the frame and mean brightness 64 may be recorded on a frame-by-frame basis. The location information 62 may then be passed to the object range estimation module 54, and the mean brightness 64 may be directly passed to the visibility estimation module 56.

In the object range estimation module 54, the video processing unit 12 may use the location data stream 62, indicating the varying location of the one or more objects within the various frames 62, together with data 66 from the odometry sensor 16 to estimate an approximate distance between the vehicle 10/camera 14 and the object at each frame.

The odometry sensor 16 may, for example, include an angular speed and/or angular position sensor associated with one or more vehicle wheels 68, which may be configured to monitor the rotational speed/position of the wheels. Additionally, the odometry sensor 16 may include a steering sensor configured to detect the steering angle of the wheels. In this manner, the odometry sensor 16 may obtain a sufficient amount of information to estimate any vehicle motion (i.e., translation and/or rotation) and/or motion of the coupled camera 14 during vehicle operation.

In an alternate configuration, a global positioning system can be utilized to determine the absolute motion and/or odometry of the vehicle 10/camera 14. As may be understood in the art, a global positioning system may utilize externally broadcasted signals (typically broadcasted via geo-stationary satellites) to triangulate an absolute position. Likewise a digital compass may be used to obtain the heading/orientation of the vehicle 10 throughout the range of vehicle motion.

The object range estimation module 54 may use vision-based processing algorithms, such as for example, Structure-From-Motion techniques, to estimate the egomotion of the camera 14 (and vehicle 10) relative to the one or more detected objects. From this motion analysis, the range estimation module 54 may estimate a distance between the camera 14 and each respective object on a frame-by-frame basis. For example, as schematically illustrated in FIG. 3, the range estimation module 54 may attempt to estimate distances 70, 72, 74, between the vehicle 10 and the object 60, for respective frames 32, 34, 36. The range-estimation algorithm may be further informed using the actual recorded motion of the vehicle 10 (i.e., odometry data 66), which may be temporally synchronized with the video data stream 24.

If the perceived motion of the object does not behave as expected (i.e., distance rays 70, 72, 74 do not coincide at a point) then the object may be discounted or rejected as being non-stationary and/or erroneous. Likewise, if there are multiple tracked objects, the object range estimation module 54, may look for a consensus behavior, and may then discount or reject objects that are found to be outside of a confidence band of the consensus. Referring again to FIG. 4, once computed, the estimated object distances (collectively, distances 76) may be passed from the range estimation module 54 to the visibility estimation module 56.

The visibility estimation module 56 may attempt to estimate the ambient visibility using a theory of range-dependent object brightness. According to this theory, as object moves farther away from the observer, the object's perceived brightness may become attenuated due to the scattering of its radiance by particles in the medium. This attenuation may cause the object to look darker to the observer as an increasing function of distance.

While the atmospheric conditions tend to attenuate the perceived brightness of an object as a function of distance, the same conditions can also cause the general level of background brightness to increase as a function of distance, i.e., due to ambient light scattering. Therefore, the general perceived brightness (I) of an object can be expressed according to Equation 1, which is generally derived from Koschmieder's Law.

$$I = R \cdot e^{-\beta d} + A \cdot (1 - e^{-\beta d}) \qquad \text{Equation 1}$$

As provided in Equation 1, R represents the radiance of the object, A represents the amount of available ambient atmospheric light, d represents the distance between the perceiver and the object, and β represents the scattering coefficient. The scattering coefficient is a non-negative value, where a coefficient of 0 represents ideal or infinite visibility, while on foggy conditions the scattering coefficient will be higher.

Figure 5:
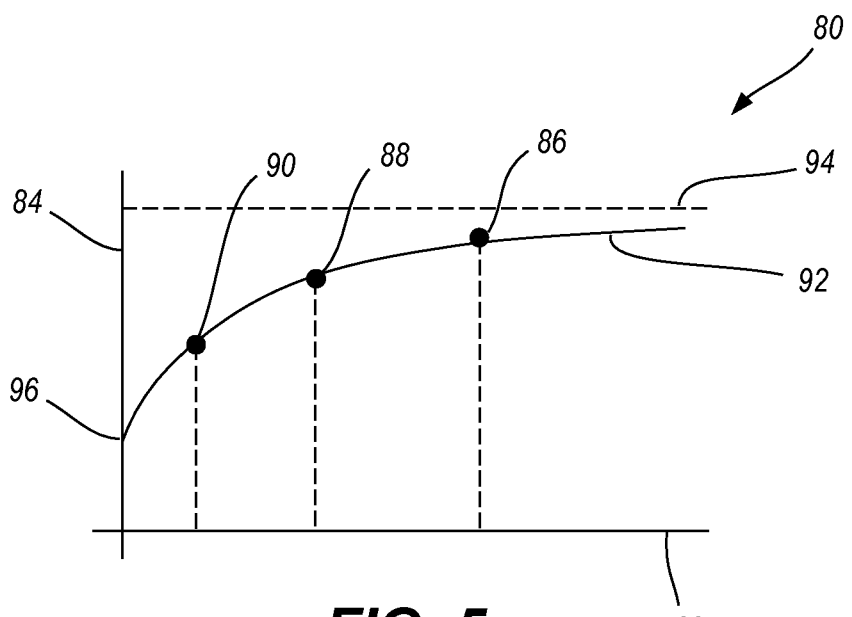
FIG. 5 is a schematic graph of the average brightness of an object at a plurality of estimated distances.

For each captured frame, the visibility estimation module 56 may correlate an object's mean perceived brightness (I) with the respective estimate of the distance to that object (d). As generally illustrated in FIG. 5, these point pairs may be plotted on a graph 80, with distance 82 on the horizontal axis, and perceived brightness 84 on the vertical axis. As shown, point 86 may correspond to object 60 in frame 32, point 88 may correspond to the same object 60 in frame 34, and point 90 may likewise correspond to the object 60 in frame 36. A curve 92 may be fitted to these points according to the function described in Equation 1. As such, asymptote 94 may represent A, and the intercept 96 (i.e., d=0) may represent R.

While R may be an object-specific variable, A and β should apply equally to any object identified within the frame/sequence 31. Therefore, in a situation where multiple objects are identified, A and β may be selected such that a curve may be drawn with minimal error (e.g. RMS) between the point pairs and curve for each respective object. Once the optimal curve parameters are determined, the scattering coefficient (β) may serve as an estimate of the ambient visibility 48, which may then be output to the system control module 58.

In the estimation technique described above, the mean brightness 64 may be computed in a manner that is largely independent of the resolution of the object. For example, the mean brightness may be equally represented whether the object occupies 100 pixels or 100 k pixels. This technique presents advantages over video analysis techniques that may be reliant on color variations or on the contrast of the object.

As generally described above, the system control module 58 may receive the estimate of the ambient visibility 48, and may make one or more control decisions in response. More specifically, the system control module 58 may compare the received scattering coefficient (β) to one or more stored thresholds. If the scattering coefficient exceeds the one or more thresholds, the module 58 may infer that the vehicle is operating in sub-optimal driving conditions (i.e., visibility is poor) and may alert the driver and/or adjust the operation of one or more vehicle systems in response. For example, in one configuration, if the visibility is poor, the system control module 58 may provide a control signal 46 to the engine/powertrain 20 to artificially limit the maximum speed of the vehicle 10. In another configuration, the system control module 58 may provide a control signal 46 to the headlights 22 to illuminate the fog lights, or to prevent the high-beam headlights from illuminating. In still other configurations, the control signal 46 may be operative to alter the behavior of steering systems, vehicle monitoring/response systems, driver alert systems, and/or transmission shift points. In another configuration, where inputs from several sensors of different modalities are fused into a unified surround perception system, the reliability weight of each sensor could be adjusted according to its known limitations and sensitivity to adverse visibility conditions (e.g. radar may be less sensitive to adverse visibility conditions than cameras, and thus should be afforded a higher confidence weight in the fused perceived object map).

In addition to the above described system/method, other perceived sensor data may be captured and fused with the visual data to determine the ambient visibility. For example, radar information may be less susceptible to ambient visibility conditions such as fog or haze. Therefore radar data may be obtained and fused with the camera data to better determine the true position of the one or more objects, which may aid in better estimating the scattering coefficient to a greater confidence.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A system for estimating daytime visibility conditions comprising:
   a camera configured to capture a video sequence over a period of time, the video sequence including a plurality of image frames;
   an odometry sensor configured to monitor motion of the camera and output odometry data indicative of the monitored motion;
   a video processing unit in communication with the camera and with the odometry sensor, the video processing unit configured to:
   receive the video sequence from the camera;
   detect an object within the video sequence;
   estimate a distance between the camera and the object for each of the plurality of image frames;
   determine a mean perceived brightness of the object for each of the plurality of image frames; and
   estimate an ambient visibility by:
   assembling a plurality of point pairs, each point pair including an estimated distance of the object and a determined mean perceived brightness of the object, and corresponding to the object in a different respective one of the plurality of image frames;
   fitting a curve to the plurality of point pairs, the curve based on a range-dependent object brightness model; and
   determining a scattering coefficient from the fitted curve, wherein the scattering coefficient is indicative of an estimate of ambient visibility.

2. The system of claim 1, wherein the video processing unit is further configured to compare the estimate of ambient visibility to a threshold, and to perform a control action if the estimate exceeds the threshold.

3. The system of claim 2, further comprising a light source, and wherein the control action includes illuminating the light source.

4. The system of claim 1, wherein detecting an object within the video sequence includes: detecting an image region having defined boundaries; and examining the motion of the image region between at least two of the plurality of image frames for motion of the object within the frame.

5. The system of claim 1, wherein the video processing unit is configured to estimate the distance between the camera and the object using the varying location of the object between at least two of the plurality of image frames, together with the received odometry data.

6. The system of claim 5, wherein the video processing unit is further configured to estimate the distance between the camera and the object using a structure-from-motion processing technique.

7. The system of claim 1, wherein the odometry sensor includes a wheel speed sensor and a steering angle sensor.

8. A method of estimating an ambient visibility comprising:
   acquiring a video sequence from a camera associated with a moving vehicle, the video sequence including a plurality of image frames;
   detecting an object within the video sequence;
   estimating a distance between the camera and the object for each of the plurality of image frames;
   determining a mean perceived brightness of the object for each of the plurality of image frames; and
   estimating an ambient visibility by:
      assembling a plurality of point pairs, each point pair including an estimated distance of the object and a determined mean perceived brightness of the object, and corresponding to the object in a different respective one of the plurality of image frames;
      fitting a curve to the plurality of point pairs, the curve based on a range-dependent object brightness model; and
      determining a scattering coefficient from the fitted curve, wherein the scattering coefficient is indicative of an estimate of ambient visibility.

9. The method of claim 8, further comprising: comparing the estimate of ambient visibility to a threshold; and
   performing a control action if the estimate exceeds the threshold.

10. The method of claim 9, wherein performing a control action includes illuminating a light source.

11. The method of claim 9, wherein performing a control action includes speed-limiting an engine.

12. The method of claim 8, wherein detecting an object within the video sequence includes: detecting an image region having defined boundaries; and
   examining the motion of the image region between at least two of the plurality of image frames for motion of the object within the frame.

13. The method of claim 8, further comprising receiving data indicative of the motion of the camera; and
   wherein estimating the distance between the camera and the object includes analyzing differences in the appearance of the object between at least two of the plurality of image frames, in view of the received motion data.

14. The method of claim 8, wherein the object is a first object; and further comprising:
   detecting a second object within the video sequence;
   estimating a distance between the camera and the second object for each of the plurality of image frames;
   determining a mean perceived brightness of the second object for each of the plurality of image frames; and
   wherein estimating an ambient visibility includes determining a scattering coefficient from the estimated distances and mean perceived brightnesses of the first and second objects across the plurality of image frames.

15. The method of claim 8, further comprising fusing perceived radar information with the acquired video sequence.

16. The method of claim 8, further comprising adjusting the weighting of one or more perception systems in a composite sensor fusion using the estimate of ambient visibility.

* * * * *